(12) United States Patent
Agarwal et al.

(10) Patent No.: US 10,585,722 B2
(45) Date of Patent: Mar. 10, 2020

(54) INTEGRATING HETEROGENEOUS BUSINESS EVENTS IN HYBRID CLOUD ENVIRONMENTS

(71) Applicant: International Business Machines Corporation, Armonk, NY (US)

(72) Inventors: Matu Agarwal, Bangalore (IN); John Kurian, Bangalore (IN); Ramya Rajendiran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 15/373,169

(22) Filed: Dec. 8, 2016

(65) Prior Publication Data

US 2018/0165137 A1  Jun. 14, 2018

(51) Int. Cl.
*G06F 9/54* (2006.01)
*G06F 17/30* (2006.01)
*H04L 29/08* (2006.01)
*G06F 16/25* (2019.01)

(52) U.S. Cl.
CPC .............. *G06F 9/542* (2013.01); *G06F 9/541* (2013.01); *G06F 16/25* (2019.01); *H04L 67/2823* (2013.01)

(58) Field of Classification Search
None
See application file for complete search history.

(56) References Cited

U.S. PATENT DOCUMENTS

| | | | |
|---|---|---|---|
| 6,424,354 B1* | 7/2002 | Matheny | G06F 3/0481 345/619 |
| 9,086,935 B2 | 7/2015 | Budai et al. | |
| 2005/0160280 A1* | 7/2005 | Caslin | G06F 21/55 713/189 |
| 2005/0243984 A1* | 11/2005 | Mahone | G06F 21/55 379/114.14 |
| 2008/0177839 A1* | 7/2008 | Chang | G06Q 10/10 709/205 |
| 2012/0102085 A1 | 4/2012 | Gretter | |
| 2012/0137306 A1 | 5/2012 | Sarferaz et al. | |
| 2012/0204187 A1* | 8/2012 | Breiter | G06F 9/5072 718/105 |
| 2012/0272249 A1* | 10/2012 | Beaty | G06F 9/5083 719/318 |
| 2012/0296876 A1* | 11/2012 | Bacinschi | H04L 63/12 707/687 |
| 2013/0080642 A1* | 3/2013 | Adam | G06F 15/173 709/226 |
| 2015/0142913 A1* | 5/2015 | Chaudhari | H04L 47/808 709/217 |
| 2015/0373012 A1 | 12/2015 | Bartz et al. | |
| 2015/0381568 A1* | 12/2015 | Johnson | H04L 63/0272 726/15 |
| 2016/0103661 A1 | 4/2016 | Meigen et al. | |

* cited by examiner

*Primary Examiner* — Umut Onat
(74) *Attorney, Agent, or Firm* — Patterson + Sheridan, LLP

(57) ABSTRACT

Systems, methods, and computer program products to perform an operation comprising receiving a request from a first application to receive business events from a second application, deploying a first connector selected according to a set of parameters specified in the request, receiving, by the first connector from the second application, a first unit of event data of a first format, and converting the first unit of event data to a second format specified in the request.

20 Claims, 5 Drawing Sheets

INTEGRATING HETEROGENEOUS BUSINESS EVENTS IN HYBRID CLOUD ENVIRONMENTS

BACKGROUND

The present invention relates to cloud computing, and more specifically, to integrating heterogeneous business events in hybrid cloud environments.

Software-as-a-service (SaaS) is a cloud computing paradigm used to deliver applications over the Internet as a service. These applications provide different services to customers by performing a variety of automated, business-related computations that directly provide the desired output. Often, these applications communicate with each other (and/or other external systems) via business events. A business event is a data unit which includes embedded event data, and may be formatted according to proprietary and/or standard formats. Applications generate and emit the business events, which are consumed by other applications for further processing based on the embedded event data. Because of the various business event formats, consuming applications must be aware of each business event format to consume business events from all sources. Furthermore, applications may emit business events by different techniques (e.g., different protocols), meaning consuming applications must be further aware of how to receive the business events. As SaaS platforms continue to provide expanding numbers and types of services, configuring each application to properly receive and consume business events becomes challenging.

SUMMARY

According to one embodiment, a method comprises receiving a request from a first application to receive business events from a second application, deploying a first connector selected according to a set of parameters specified in the request, receiving, by the first connector from the second application, a first unit of event data of a first format, and converting the first unit of event data to a second format specified in the request.

In another embodiment, a system comprises one or more computer processors and a memory storing a program which when executed by the processors performs an operation comprising receiving a request from a first application to receive business events from a second application, deploying a first connector selected according to a set of parameters specified in the request, receiving, by the first connector from the second application, a first unit of event data of a first format, and converting the first unit of event data to a second format specified in the request.

In another embodiment, a computer program product comprises a computer-readable storage medium, the computer-readable storage medium storing instructions which when executed by a processor, performs an operation comprising receiving a request from a first application to receive business events from a second application, deploying a first connector selected according to a set of parameters specified in the request, receiving, by the first connector from the second application, a first unit of event data of a first format, and converting the first unit of event data to a second format specified in the request.

DETAILED DESCRIPTION

Embodiments disclosed herein provide a unified mechanism for business event integration in a heterogeneous (or hybrid) cloud computing environment. More specifically, embodiments disclosed herein provide a business event mediator which acts as a bridge between the heterogeneous business applications executing in the cloud and target consumer applications (which may be deployed in the same cloud computing environment, or other cloud computing environments). Generally, a receiving application may need to receive business events from a target application. As such, the receiving application may issue a request to the business event mediator which specifies the required parameters to receive and consume the business events from the target application. In response, the business event mediator deploys a connector based on the information specified in the request. The connector then listens for business events emitted by the target application. Once the listener receives business events, the connector provides the business events to the business event mediator. The business event mediator then converts the business events to a format understood by the receiving application, and provides the converted business events to the receiving application. Doing so allows applications in a hybrid cloud environment to uniformly access business events generated from multiple business application providers.

Figure 1:
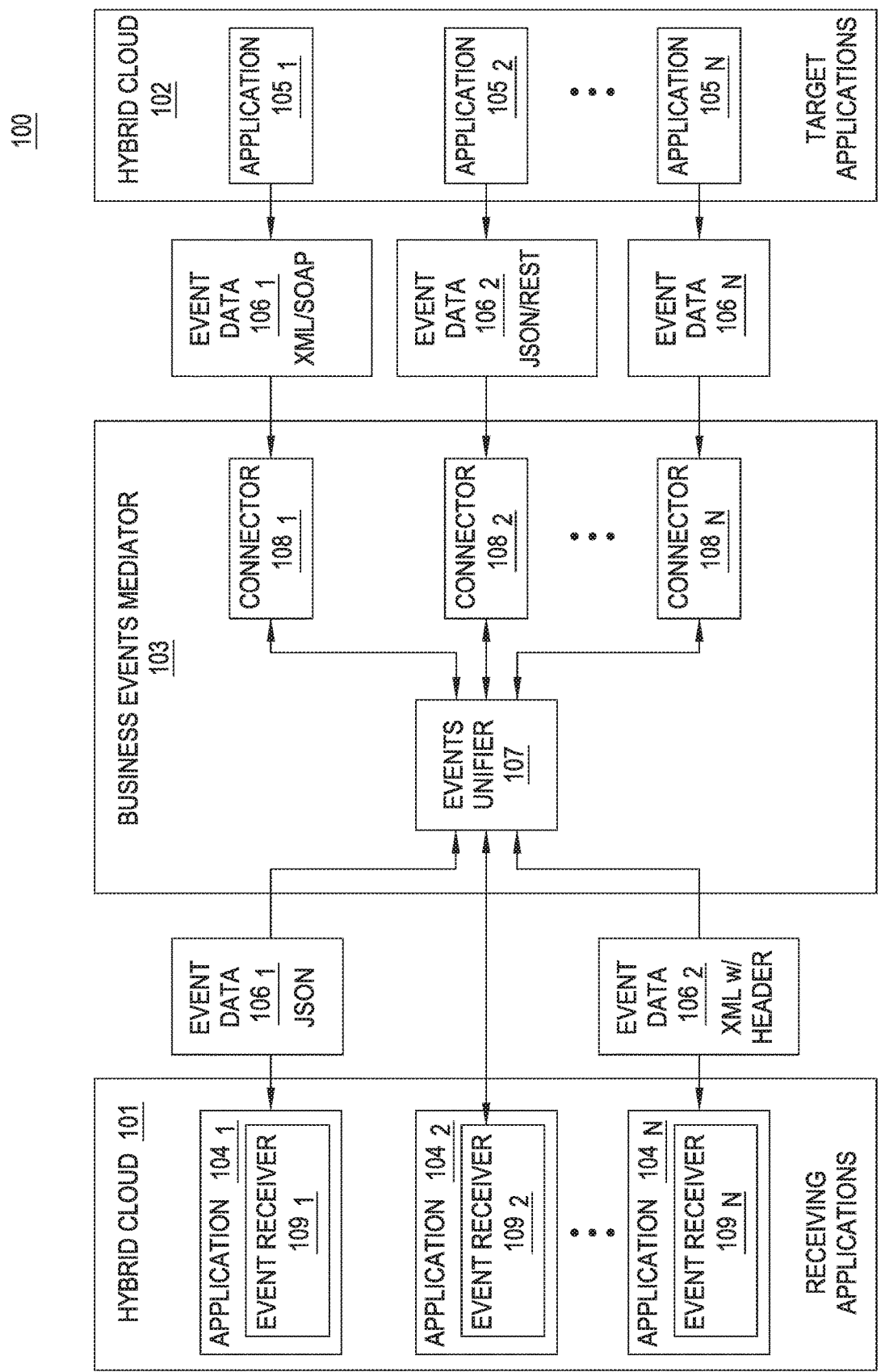
FIG. 1 illustrates an example system architecture which integrates heterogeneous business events in hybrid cloud environments, according to one embodiment.

FIG. 1 illustrates an example system architecture 100 which integrates heterogeneous business events in hybrid cloud environments, according to one embodiment. As shown, the system 100 includes a hybrid cloud 101, a hybrid cloud 102, and a business event mediator 103. The hybrid clouds 101, 102 are hybrid cloud computing environments that provide applications $104_{1-N}$ and $105_{1-N}$, respectively. Generally, hybrid cloud computing environments provide a mix of private cloud and public cloud services and orchestration between the two types of cloud platforms (e.g., to move workloads between private and public clouds as computing needs and/or costs change). The applications $104_{1-N}$ and $105_{1-N}$ are representative of any type of application and/or service, such as web servers, database management systems, databases, payroll services, and the like.

Illustratively, the applications $105_{1-N}$ generate and output business events as event data $106_{1-N}$. Generally, business events include any event of significance that happens in a system, such as database data generated by an application $105_{1-N}$, sensor data outputted by an application $105_{1-N}$. A user and/or developer may define any type of business event for each of the applications $105_{1-N}$. Furthermore, users may also define data formats for the business events, protocols used to establish a connection to receive business events, lifecycle calls for business event delivery, assurance models used to guarantee event delivery, and programming languages used to expose application programming interfaces (APIs). Generally, the attributes of the business events (and emitted event data $106_{1-N}$) vary as between the different applications $105_{1-N}$. For example, application $105_1$ may be configured to generate the event data $106_1$ according to the extended markup language (XML) format, while application $105_2$ may be configured to generate event data $106_2$ according to the JAVASCRIPT Object Notation (JSON) format. Furthermore, application $105_1$ may provide a Simple Object Access Protocol (SOAP) API with a web service operation to allow consuming applications (e.g., the applications $104_{1-N}$) to detect business event data $106_1$ in polling mode (e.g., where the applications $104_{1-N}$ actively check for business event data $106_1$), while application $105_2$ provides a REpresentational State Transfer (REST) API with a REST service that can be used in polling mode to allow consuming applications to detect business event data $106_2$. Furthermore, a given application $105_{1-N}$ itself may include multiple business event distinctions (e.g., different ways to emit and/or detect business events). For example, in addition to the REST API and REST service, application $105_2$ may also provide a streaming API that uses polling for emitting business events to subscribed applications $104_{1-N}$, where the event data $106_2$ is formatted in JSON.

Furthermore, the receiving applications $104_{1-N}$ may also be heterogeneous. As shown, each application $104_{1-N}$ includes a respective event receiver $109_{1-N}$. Each event receiver $109_{1-N}$ is configured to receive business events on behalf of the respective application $104_{1-N}$. The event receivers $109_{1-N}$ may be written in different programming languages, operate in different modes (e.g., via a REST service, SOAP service, etc.), and process business events (e.g., the event data $106_{1-N}$) that is formatted according to a respective predefined format. These distinctions make consuming the event data $106_{1-N}$ impractical or impossible without user intervention. For example, the users would have to identify each distinction, and hard code each application $104_{1-N}$ to communicate with each application $105_{1-N}$ to detect, receive, and consume the event data $106_{1-N}$.

The business event mediator 103 is a middleware application in a middleware environment (not pictured) that bridges the applications $104_{1-N}$ and $105_{1-N}$. More specifically, the business event mediator 103 is an integration component which can connect to different target applications $105_{1-N}$ using connectors $108_{1-N}$. The business event mediator 103 understands the various programming technologies, data formats, lifecycle calls to subscribe and/or unsubscribe to a stream of business events, and protocols used by the applications $105_{1-N}$ to generate and emit a stream of business events as event data $106_{1-N}$. As shown, the business event mediator 103 includes an events unifier 107 and the connectors $108_{1-N}$. The business event mediator 103 deploys each connector $108_{1-N}$ responsive to a request by one or more of the receiving applications $104_{1-N}$. The connectors $108_{1-N}$ are configured to listen for and receive business events (e.g., the event data $106_{1-N}$) from one or more of the target applications $105_{1-N}$. Each request issued by the applications $104_{1-N}$ includes the information necessary for the business event mediator 103 to generate the connectors $108_{1-N}$. Specifically, the requests may include, without limitation, an indication of a target application $105_{1-N}$, information required to establish a connection with the target application $105_{1-N}$ (e.g., internet protocol (IP) address, protocols, and the like), format of the event data $106_{1-N}$ emitted by the target application $105_{1-N}$, a type of the business event emitted by the target application $105_{1-N}$, and an indication of the configuration of each respective event emitter $109_{1-N}$. However, in at least one embodiment, the business event mediator 103 may re-use an existing connector $108_{1-N}$ (e.g., a connector $108_N$ previously generated by the business event mediator 103, or a connector $108_N$ from an application developer or other source) in lieu of generating a duplicate instance of the requested connector $108_{1-N}$.

Once the business event mediator 103 deploys a connector $108_{1-N}$, the connector $108_{1-N}$ starts listening from business events from the target application $105_{1-N}$. Specifically, the connectors $108_{1-N}$ connect to the target applications $105_{1-N}$ using the protocols supported by the target applications $105_{1-N}$. The connectors $108_{1-N}$ further manage the lifecycle calls provided by the target application $105_{1-N}$. The lifecycle calls allow the connectors $108_{1-N}$ to subscribe and/or unsubscribe from a stream of business events provided by the target applications $105_{1-N}$. When the connectors $108_{1-N}$ detect event data $106_{1-N}$, the connectors $108_{1-N}$ receive or retrieve the event data $106_{1-N}$ depending on the particular protocols used by the application $105_{1-N}$. Once a connector $108_{1-N}$ receives/retrieves a unit of event data $106_{1-N}$, the connector $108_{1-N}$ provides the event data $106_{1-N}$ to the events unifier 107 for further processing.

The events unifier 107 is configured to receive the event data $106_{1-N}$ (which may be in different formats) from each of the connectors $108_{1-N}$, and convert the event data $106_{1-N}$ to a format requested by the respective application $104_{1-N}$. In addition, the events unifier 107 may add metadata to each unit of event data $106_{1-N}$, such as a timestamp, a target application identifier, and the like. Therefore, as shown, the connector $108_1$ receives the event data $106_1$ via the SOAP protocol, where the event data $106_1$ is in XML format. The connector $108_1$ then provides the XML event data $106_1$ to the events unifier 107. As shown, the events unifier 107 converts the event data $106_1$ from the XML format to the JSON format. Furthermore, as shown, the connector $108_2$ receives the event data $106_2$ via the REST protocol, where the event data $106_2$ is in the JSON format. The connector $108_2$ then provides the JSON event data $106_2$ to the events unifier 107. As shown, the events unifier 107 converts the event data $106_2$ from the JSON format to the XML format, and appends a metadata header to the event data $106_2$.

Once the events unifier 107 has processed the event data $106_{1-N}$, the events unifier 107 sends the processed event data $106_{1-N}$ to the event receiver $109_{1-N}$ of the associated application $104_{1-N}$. The event data $106_{1-N}$ is then registered and used by the receiving application $104_{1-N}$.

Figure 2:
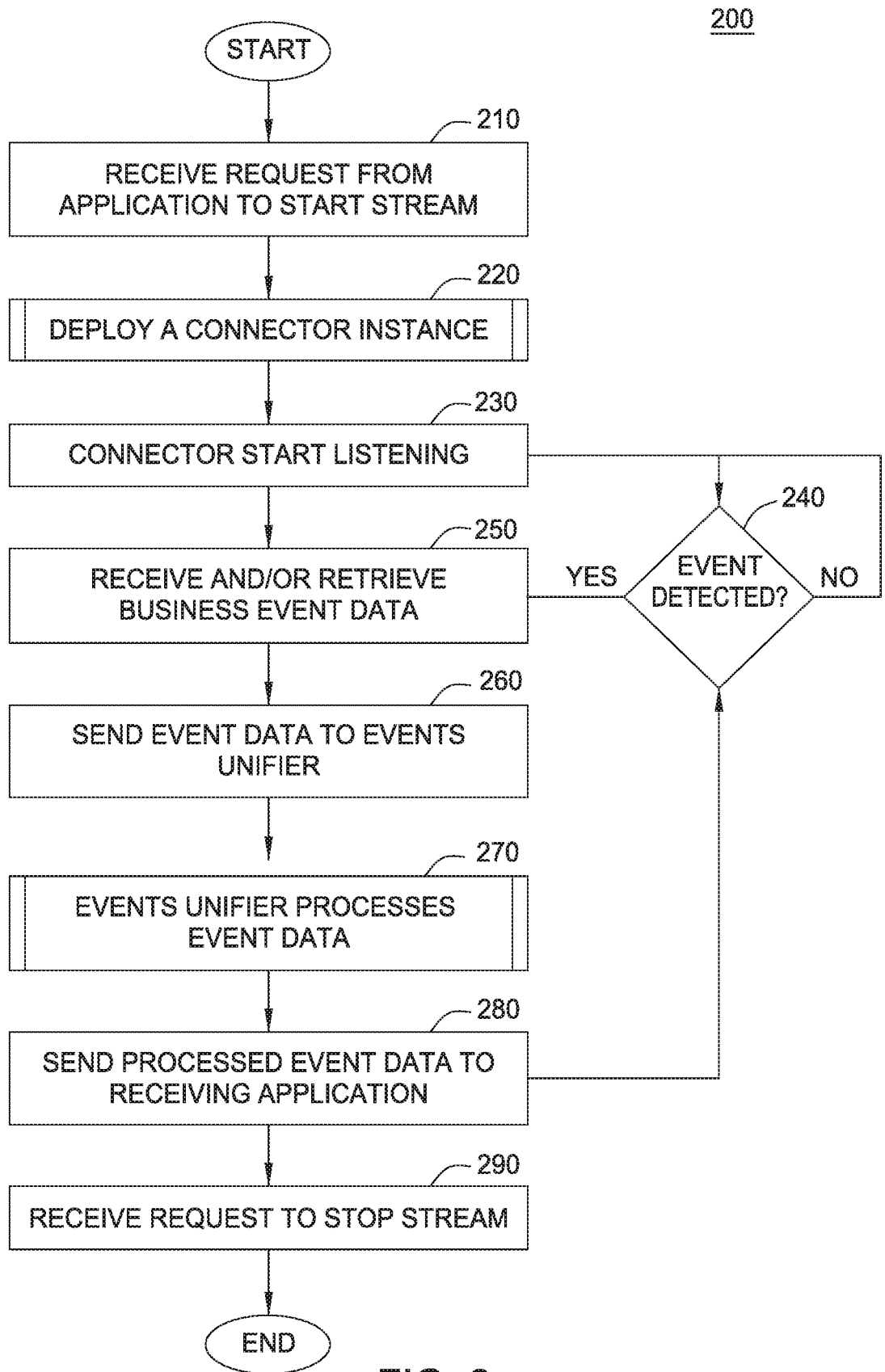
FIG. 2 is a flow chart illustrating a method to integrate heterogeneous business events in hybrid cloud environments, according to one embodiment.

FIG. 2 is a flow chart illustrating a method 200 to integrate heterogeneous business events in hybrid cloud environments, according to one embodiment. As shown, the method 200 begins at block 210, where the business event mediator 103 receives a request from one of the applications $104_N$ to start a new stream for receiving business events from a target application $105_N$. In at least one embodiment, the event receiver $109_N$ generates and sends the request to the business event mediator 103. The request includes parameters used by the business event mediator 103 to deploy an instance of a connector $108_N$ at block 220, described in greater detail with reference to FIG. 3. Generally, the request includes parameter values including information required for the connector $108_N$ to connect to the target application $105_N$, a type of the corresponding event data $106_N$, a format of the corresponding event data $106_N$, protocols and APIs used by the target application $105_N$, and information about the event receiver $109_N$ of the requesting application $104_N$. In at least one embodiment, the requesting application $104_N$ generates the request based on a data store which stores configuration information for each application $105_N$.

At block 230, the connector $108_N$ deployed at block 220 connects to the target application $105_N$ and begins listening for business events according to the protocols and APIs provided by the target application $105_N$. At block 240, the connector $108_N$ determines whether a business event has been detected. Generally, the connector $108_N$ detects business events based on the mechanisms supported by the target application $105_N$. For example, the target application $105_N$ may support one or more of polling, callbacks, streaming, web hooks, and the like. If the connector $108_N$ does not detect a business event at block 240, the connector $108_N$ keeps listening for business events in a loop. If the connector $108_N$ detects a business event, the connector $108_N$ receives and/or retrieves the event data $106_N$ from the target application $105_N$ based on the mechanism supported by the target application $105_N$.

At block 260, the connector $108_N$ sends the event data $106_N$ to the events unifier 107. At block 270, described in greater detail with reference to FIG. 4, the events unifier 107 processes the event data $106_N$. Generally, the events unifier 107 converts the event data $106_N$ to a format understood by the requesting application $104_N$, and may optionally append a metadata header to the event data $106_N$. At block 280, the events unifier 107 and/or the business event mediator 103 sends the processed event data $106_N$ to the event receiver $109_N$ of the requesting application $104_N$, where the requesting application $104_N$ can further process the event data $106_N$. In some embodiments, the method returns to block 240, where the connector $108_N$ continues to listen for business events from the target application $105_N$. At block 290, the business event mediator 103 receives a request from the requesting application $104_N$ to stop listening for business events. In response, the business event mediator 103 may remove or deactivate the connector $108_N$.

Figure 3:
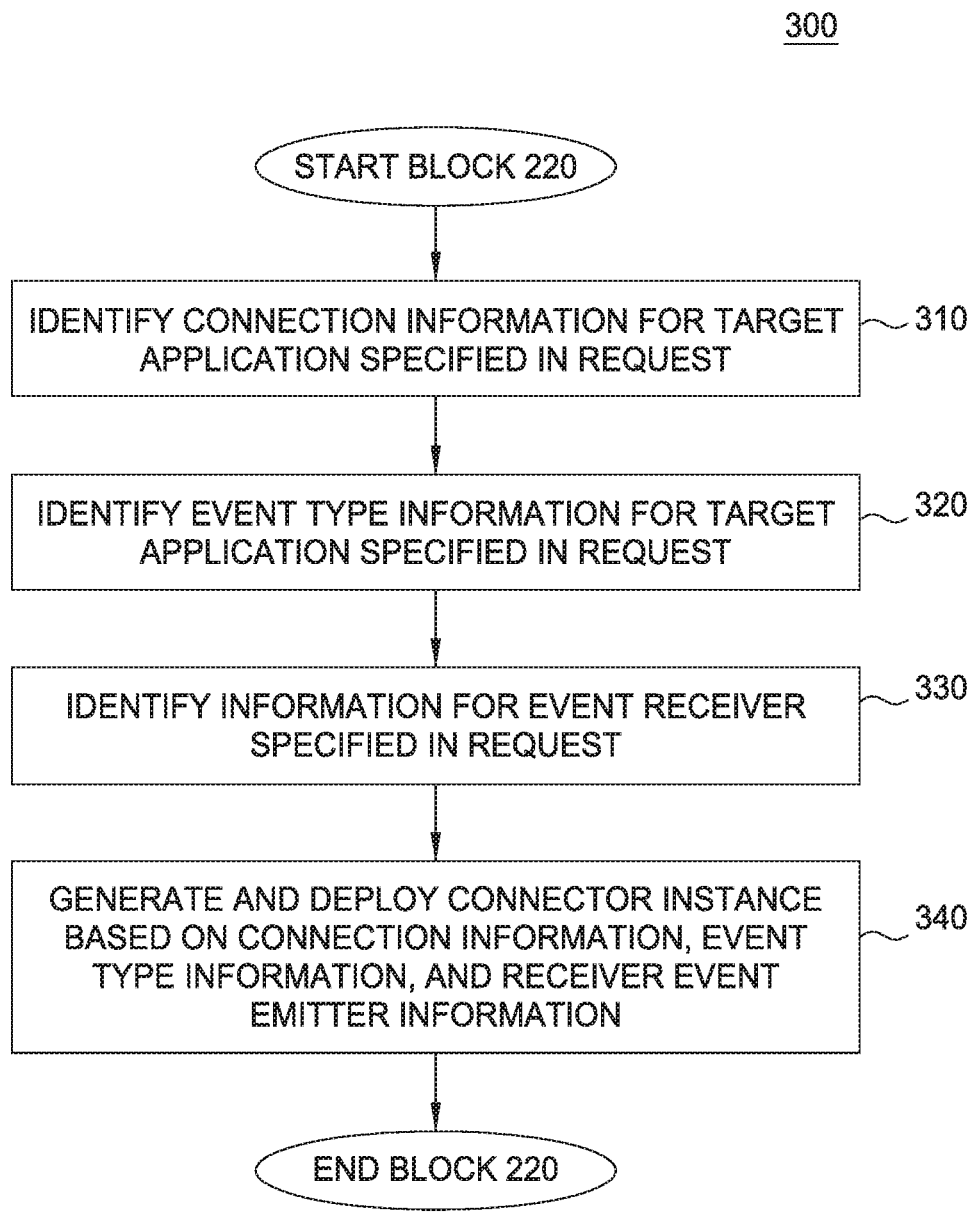
FIG. 3 is a flow chart illustrating a method to deploy an instance of a connector, according to one embodiment.

FIG. 3 is a flow chart illustrating a method 300 corresponding to block 220 to deploy an instance of a connector, according to one embodiment. As shown, the method 300 begins at block 310, where the business event mediator 103 identifies the connection information for the target application $105_N$ specified in the request. The connection information may include IP addresses, ports, and protocols used by the target application $105_N$. For example, the target application $105_N$ may provide a variety of different options for detecting business events, such as a SOAP API that uses polling to detect business events, a REST API with a REST service that can be used in polling mode to detect business events, and a streaming API that uses long polling for emitting events to subscribed clients. However, the request may specify to use the REST API with the REST service in polling mode. Therefore, the business event mediator 103 may configure the connector $108_N$ to interface with the REST API and the REST service in polling mode. Furthermore, the request may specify an assurance model supported by the target application $105_N$ to guarantee delivery of business events.

At block 320, the business event mediator 103 identifies an event type for the target application $105_N$ specified in the request. The event type may include a format of the event data $106_N$ as well as a structure of the event data $106_N$ (e.g., an ordering and type of parameters included in a business event emitted as event data $106_N$), and the like. For example, the application $105_N$ may emit events in XML, JSON, or some other proprietary format. However, the request may specify to listen for XML business events. As such, the business event mediator 103 may configure the connector $108_N$ to listen for event data $106_N$ in XML format.

At block 330, the business event mediator 103 identifies information describing the requesting event receiver $109_N$ specified in the request. For example, the request may indicate an application $104_N$ the event receiver $109_N$ is associated with, how the application $104_N$ and/or event receiver $109_N$ listen for business events (e.g., REST, SOAP, etc.), whether the event data $106_{1-N}$ is retrieved (pull mode) or received (push mode), and the like. At block 340, the business event mediator 103 generates an instance of the requested connector $108_N$ based on the information determined at blocks 310-330. The business event mediator 103 may then deploy the connector $108_N$, which connects to the target application $105_N$, and listens for business events in the form of business event data $106_N$. In at least one embodiment, the business event mediator 103 stores metadata included in the request used to generate the connector $108_N$ in a data store in a record associated with the connector $108_N$. The metadata may include information about the application $105_N$, the event data $106_N$ emitted by the application $105_N$, and the like.

Figure 4:
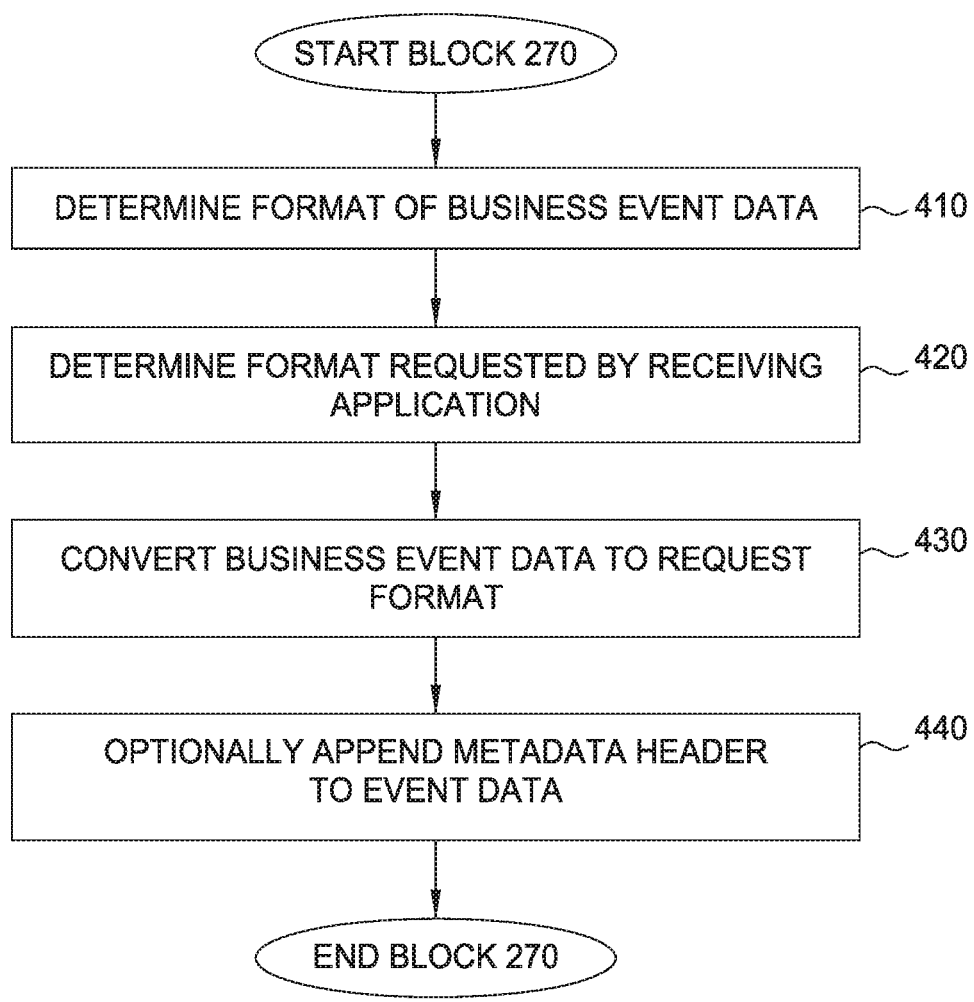
FIG. 4 is a flow chart illustrating a method to process a message, according to one embodiment.

FIG. 4 is a flow chart illustrating a method 400 corresponding to block 270 to process a message, according to one embodiment. As shown, the method 400 begins at block 410, where the events unifier 107 determines the format of a unit of event data $106_N$ received from a connector $108_N$. The events unifier 107 may determine the format by examining the unit of event data $106_N$, reading metadata provided by the connector $108_N$ (e.g., the connector $108_N$ provides relevant configuration data used to generate the connector $108_N$), and referencing a data store specifying the parameters associated with the connector $108_N$ (which includes the type and format of event data $106_N$ received by the connector $108_N$). At block 420, the events unifier 107 determines a format requested by the receiving application $104_N$. The events unifier 107 may determine the requested format based on metadata in a data store associated with the application $104_N$. At block 430, the events unifier 107 converts the event data $106_N$ to the format requested by the application $104_N$. For example, the event data $106_N$ received by the connector $108_N$ may be in a JSON file, while the application $104_N$ requests event data $106_N$ to be in an XML file. As such, the events unifier 107 may convert the data in the JSON file to an XML format. At block 440, the events unifier 107 may optionally append a metadata header to the event data $106_N$. The metadata header may include one or more of a timestamp when the event data $106_N$ was emitted (or received), an indication of the target application $105_N$ that generated the event data $106_N$, an indication of the receiver application $104_N$, and the like.

Figure 5:
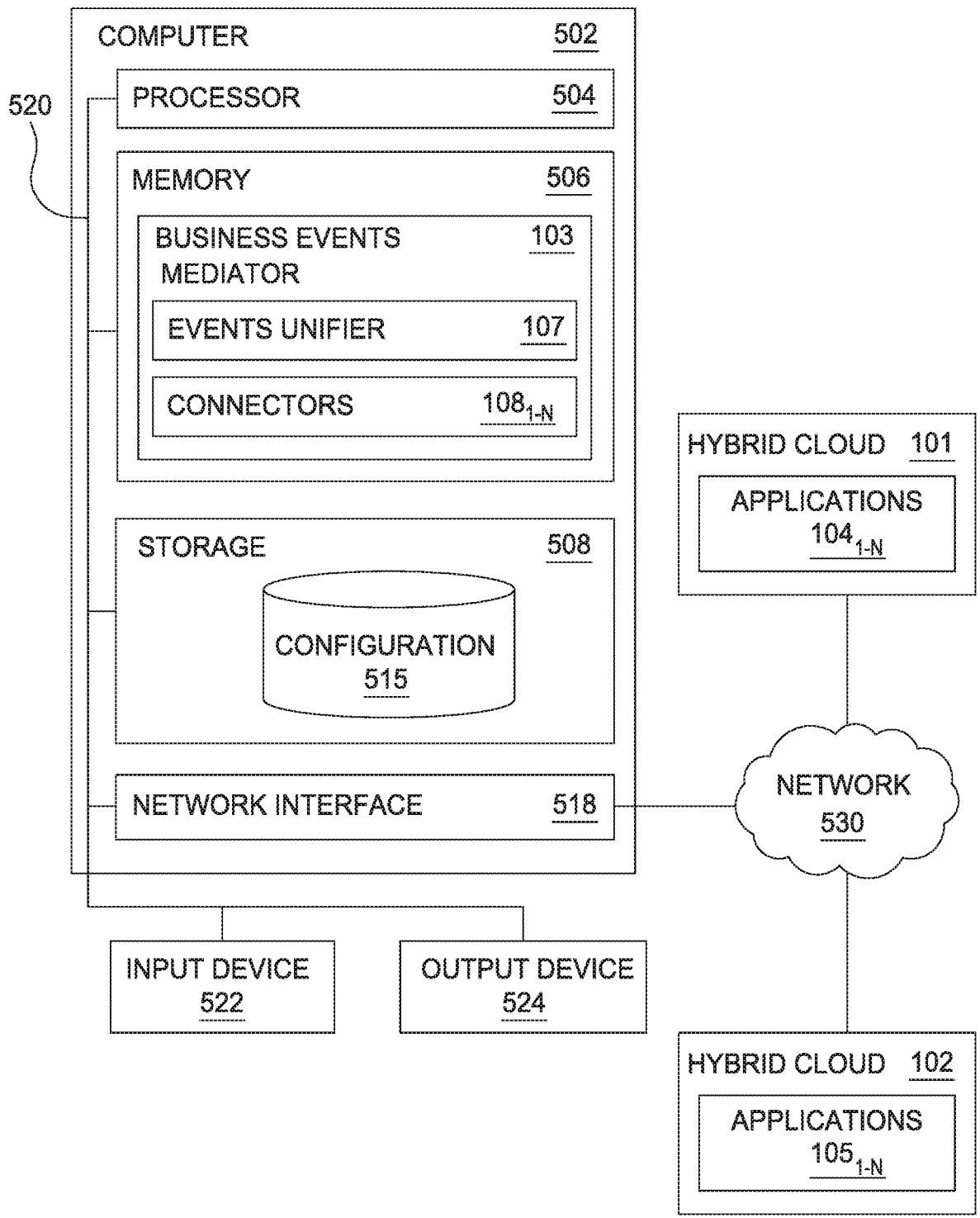
FIG. 5 is a block diagram illustrating a system which integrates heterogeneous business events in hybrid cloud environments, according to one embodiment.

FIG. 5 is a block diagram illustrating a system 500 which integrates heterogeneous business events in hybrid cloud environments, according to one embodiment. The networked system 500 includes a computer 502. The computer 502 may also be connected to other computers in the hybrid clouds 101, 102 via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 518, input devices 522, and output devices 524 connected to the bus 520. The computer 502 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the business events mediator 103, which includes the events unifier 107 and connectors $108_{1-N}$. Generally, as described above, the business events mediator 103 is a middleware component that serves as a bridge for business events between applications $104_{1-N}$ in hybrid cloud 101 and applications $105_{1-N}$ in hybrid cloud 102.

As shown, the storage 508 contains a configuration store 515, which includes metadata describing the receiving applications $104_{1-N}$ (and associated event receivers $109_{1-N}$), target applications $105_{1-N}$, event data 106 generated by the applications $105_{1-N}$, and connectors $108_{1-N}$. For example, the configuration store 515 may include information describing the types of services used and provided by the applications $104_{1-N}$, $105_{1-N}$ (e.g., REST, SOAP), the type and format of event data 106 emitted by each target application $105_{1-N}$ (e.g., XML, JSON), the type and format of event data 106 consumed by each receiving application $104_{1-N}$, rules for translating one data format to another, and the like.

Advantageously, embodiments disclosed herein unify business events emitted by heterogeneous business applications in different hybrid clouds. By providing the business events mediator 103, embodiments disclosed herein provide a portable event integration mechanism across different business application cloud platforms, which can be integrated with other middleware products. Furthermore the cost of configuring a receiving application to receive business events from heterogeneous applications is greatly reduced. The receiving application can concentrate on processing logic and be isolated from message receiving logic, as the receiving application needs to understand only one programming language, one data format, one protocol, one assurance model (if any), and one set of lifecycle calls.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the business events mediator 103 could execute on a computing system in the cloud and receive a request to deploy a connector $108_N$. In such a case, the business events mediator 103 could deploy the connector $108_N$ and store the associated configuration data 515 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, from a first application in a first hybrid cloud computing environment, a request to deploy a first connector to listen for events emitted by a second application in a second hybrid cloud computing environment, wherein the first application processes events emitted by the second application, and wherein the request specifies a set of parameters including a format of event data and a structure of event data to listen for from the second application;

responsive to receiving the request, deploying, at a middleware environment, the first connector to connect to the second application, based on the set of parameters specified in the request, wherein the set of parameters further specifies the second application and a type of event to listen for, wherein the type of event comprises a specified format and a specified structure, wherein the specified structure includes a predefined ordering of elements in the event data, and wherein deploying the first connector comprises configuring the first connector to listen for the indicated type of event, structured according to the specified structure of event data and formatted according to the specified format of event data, from the second application;

receiving, by the first connector from the second application, a first unit of event data of a first event type, wherein the first event type includes a first format that does not match the specified format;

refraining from processing the first unit of event data based on the first format not matching the specified format;

receiving, by the first connector from the second application, a second unit of event data of a second event type, wherein the second event type includes a second format; and upon determining that the second format matches the specified format of event data, converting the second unit of event data to a third format specified in the request.

2. The method of claim 1, the method further comprising:
prior to deploying the first connector, generating the first connector based on the set of parameters specified in the request.

3. The method of claim 1, wherein the set of parameters comprise: (i) a format of business events emitted by the second application, (ii) a protocol used by the first application to transmit an indication of business events, (iii) information used by the first connector to connect to the second application, (iv) an assurance model used to guarantee delivery of business events, (v) the third format of business events consumed by the first application, and (vi) a set of lifecycle calls used by the first connector to connect to the second application and disconnect from the second application.

4. The method of claim 1, further comprising:
appending a metadata header to the second unit of event data, wherein the metadata header comprises one or more of: (i) a timestamp at which the second unit of event data was emitted by the second application, and (ii) a timestamp at which the second unit of event data was received at the middleware environment.

5. The method of claim 1, further comprising:
providing the converted second unit of event data to the first application.

6. The method of claim 1, further comprising:
receiving a request from a third application to receive business events from the second application;
deploying a second connector generated based on a set of parameters specified in the request received from the third application;

receiving, by the second connector from the second application, a third unit of event data of a fourth format; and
converting the third unit of event data to a fifth format specified in the request.

7. The method of claim 1, further comprising:
receiving a second request from the first application to receive business events from the second application;
deploying a second connector generated based on a set of parameters specified in the second request;
receiving, by the connector from the first application, a third unit of event data of a fourth format; and
converting the third unit of event data to a fifth format specified in the second request.

8. A system, comprising:
one or more computer processors; and
a memory containing a program, which when executed by the processors, performs an operation comprising:
receiving, from a first application in a first hybrid cloud computing environment, a request to deploy a first connector to listen for events emitted by a second application in a second hybrid cloud computing environment, wherein the first application processes events emitted by the second application, and wherein the request specifies a set of parameters including a format of event data and a structure of event data to listen for from the second application;
responsive to receiving the request, deploying, at a middleware environment, the first connector to connect to the second application, based on the set of parameters specified in the request, wherein the set of parameters further specifies the second application and a type of event to listen for, wherein the type of event comprises a specified format and a specified structure, wherein the specified structure includes a predefined ordering of elements in the event data, and wherein deploying the first connector comprises configuring the first connector to listen for the indicated type of event, structured according to the specified structure of event data and formatted according to the specified format of event data, from the second application;
receiving, by the first connector from the second application, a first unit of event data of a first event type, wherein the first event type includes a first format that does not match the specified format;
refraining from processing the first unit of event data based on the first format not matching the specified format;
receiving, by the first connector from the second application, a second unit of event data of a second event type, wherein the second event type includes a second format; and
upon determining that the second format matches the specified format of event data, converting the second unit of event data to a third format specified in the request.

9. The system of claim 8, the operation further comprising:
prior to deploying the first connector, generating the first connector based on the set of parameters specified in the request.

10. The system of claim 8, wherein the set of parameters comprise: (i) a format of business events emitted by the second application, (ii) a protocol used by the first application to transmit an indication of business events, (iii) information used by the first connector to connect to the second application, (iv) an assurance model used to guarantee delivery of business events, (v) the third format of business events consumed by the first application, and (vi) a set of lifecycle calls used by the first connector to connect to the second application and disconnect from the second application.

11. The system of claim 8, the operation further comprising:
appending a metadata header to the second unit of event data, wherein the metadata header comprises one or more of: (i) a timestamp at which the second unit of event data was emitted by the second application, and (ii) a timestamp at which the second unit of event data was received at the middleware environment.

12. The system of claim 8, the operation further comprising:
providing the converted second unit of event data to the first application.

13. The system of claim 8, the operation further comprising:
receiving a request from a third application to receive business events from the second application;
deploying a second connector generated based on a set of parameters specified in the request received from the third application;
receiving, by the second connector from the second application, a third unit of event data of a fourth format; and
converting the third unit of event data to a fifth format specified in the request.

14. The system of claim 8, the operation further comprising:
receiving a second request from the first application to receive business events from the second application;
deploying a second connector generated based on a set of parameters specified in the second request;
receiving, by the connector from the first application, a third unit of event data of a fourth format; and
converting the third unit of event data to a fifth format specified in the second request.

15. A computer program product, comprising:
a computer-readable storage medium having computer-readable program code embodied therewith, the computer-readable program code executable by a processor to perform an operation comprising:
receiving, from a first application in a first hybrid cloud computing environment, a request to deploy a first connector to listen for events emitted by a second application in a second hybrid cloud computing environment, wherein the first application processes events emitted by the second application, and wherein the request specifies a set of parameters including a format of event data and a structure of event data to listen for from the second application;
responsive to receiving the request, deploying, at a middleware environment, the first connector to connect to the second application, based on the set of parameters specified in the request, wherein the set of parameters further specifies the second application and a type of event to listen for, wherein the type of event comprises a specified format and a specified structure, wherein the specified structure includes a predefined ordering of elements in the event data, and wherein deploying the first connector comprises configuring the first connector to listen for the indicated type of event, structured according to the specified structure of event data and formatted according to the specified format of event data, from the second application;
receiving, by the first connector from the second application, a first unit of event data of a first event type, wherein the first event type includes a first format that does not match the specified format;
refraining from processing the first unit of event data based on the first format not matching the specified format;
receiving, by the first connector from the second application, a second unit of event data of a second event type, wherein the second event type includes a second format; and
upon determining that the second format matches the specified format of event data, converting the second unit of event data to a third format specified in the request.

16. The computer program product of claim 15, the operation further comprising:
prior to deploying the first connector, generating the first connector based on the set of parameters specified in the request.

17. The computer program product of claim 15, wherein the set of parameters comprise: (i) a format of business events emitted by the second application, (ii) a protocol used by the first application to transmit an indication of business events, (iii) information used by the first connector to connect to the second application, (iv) an assurance model used to guarantee delivery of business events, (v) the third format of business events consumed by the first application, and (vi) a set of lifecycle calls used by the first connector to connect to the second application and disconnect from the second application.

18. The computer program product of claim 15, the operation further comprising:
appending a metadata header to the second unit of event data, wherein the metadata header comprises one or more of: (i) a timestamp at which the second unit of event data was emitted by the second application, and (ii) a timestamp at which the second unit of event data was received at the middleware environment.

19. The computer program product of claim 15, the operation further comprising:
providing the converted second unit of event data to the first application.

20. The computer program product of claim 15, the operation further comprising:
receiving a request from a third application to receive business events from the second application;
deploying a second connector generated based on a set of parameters specified in the request received from the third application;
receiving, by the second connector from the second application, a third unit of event data of a fourth format; and
converting the third unit of event data to a fifth format specified in the request.

* * * * *